US007933272B2

(12) United States Patent
Morris

(10) Patent No.: US 7,933,272 B2
(45) Date of Patent: Apr. 26, 2011

(54) METHODS AND SYSTEMS FOR RESOLVING A FIRST NODE IDENTIFIER IN A FIRST IDENTIFIER DOMAIN SPACE TO A SECOND NODE IDENTIFIER IN A SECOND IDENTIFIER DOMAIN SPACE

(75) Inventor: Robert P. Morris, Raleigh, NC (US)

(73) Assignee: Deep River Systems, LLC, Portsmouth, NH (US)

( * ) Notice: Subject to any disclaimer, the term of this patent is extended or adjusted under 35 U.S.C. 154(b) by 224 days.

(21) Appl. No.: 12/401,707

(22) Filed: Mar. 11, 2009

(65) Prior Publication Data
US 2010/0232433 A1     Sep. 16, 2010

(51) Int. Cl.
*H04L 12/56* (2006.01)
(52) U.S. Cl. ........................................ 370/392; 709/238
(58) Field of Classification Search .................. 370/254, 370/231, 389; 379/218, 93, 220; 709/200, 709/245, 238, 230, 203
See application file for complete search history.

(56) References Cited

U.S. PATENT DOCUMENTS

| 5,570,084 | A | 10/1996 | Ritter et al. |
| 5,771,459 | A | 6/1998 | Demery et al. |
| 6,032,175 | A * | 2/2000 | Fletcher et al. ............... 709/200 |
| 6,148,241 | A | 11/2000 | Ludtke et al. |
| 6,223,230 | B1 | 4/2001 | Garnett et al. |
| 6,236,652 | B1 | 5/2001 | Preston et al. |
| 6,262,987 | B1 | 7/2001 | Mogul |
| 6,295,479 | B1 | 9/2001 | Shima et al. |
| 6,324,585 | B1 | 11/2001 | Zhang et al. |
| 6,343,290 | B1 | 1/2002 | Cossins et al. |
| 6,421,716 | B1 | 7/2002 | Eldridge et al. |
| 6,456,892 | B1 | 9/2002 | Dara-Abrams et al. |
| 6,477,150 | B1 | 11/2002 | Maggenti et al. |
| 6,502,411 | B2 | 1/2003 | Okamoto |
| 6,643,707 | B1 * | 11/2003 | Booth ........................... 709/245 |
| 6,662,224 | B1 | 12/2003 | Angwin et al. |
| 6,728,767 | B1 | 4/2004 | Day et al. |
| 6,757,740 | B1 | 6/2004 | Parekh |

(Continued)

FOREIGN PATENT DOCUMENTS

EP         1650997        4/2006

(Continued)

OTHER PUBLICATIONS

Deering, et al., "RFC 2460—Internet Protocol, Version 6 (IPv6)," [online] The Internet Society, Dec. 1998 [retrieved on Mar. 17, 2008] Retrieved from the Internet: <URL: http://www.ietf.org/rfc/rfc2460.txt> 26 pages.

(Continued)

*Primary Examiner* — Thong H Vu

(57) ABSTRACT

Methods and systems are described for resolving a first node identifier in a first identifier domain space to a second node identifier in a second identifier domain space. In one aspect, a first node identifier from a first identifier domain space is identified. The first node identifier is included in data for transmission to a recipient. A network directory service node address is determined for a network directory service node configured to resolve the first node identifier to a second node identifier in a second identifier domain space. A message including the data and addressed to the recipient is generated. The message is transmitted to the recipient in association with transmitting, to the recipient, the network directory service node address.

36 Claims, 8 Drawing Sheets

U.S. PATENT DOCUMENTS

| | | | |
|---|---|---|---|
| 6,788,769 B1* | 9/2004 | Waites | 379/93.24 |
| 6,804,624 B2 | 10/2004 | Silverman | |
| 6,820,133 B1* | 11/2004 | Grove et al. | 709/238 |
| 6,826,617 B1 | 11/2004 | Ansell et al. | |
| 6,845,400 B2 | 1/2005 | MacPherson et al. | |
| 6,876,658 B2 | 4/2005 | Epley | |
| 6,980,566 B2 | 12/2005 | Melick et al. | |
| 7,026,949 B2 | 4/2006 | Lee et al. | |
| 7,027,582 B2 | 4/2006 | Khello et al. | |
| 7,039,689 B2 | 5/2006 | Martija et al. | |
| 7,042,867 B2 | 5/2006 | Whitehill et al. | |
| 7,072,963 B2 | 7/2006 | Anderson et al. | |
| 7,136,932 B1* | 11/2006 | Schneider | 709/245 |
| 7,167,448 B2* | 1/2007 | Wookey et al. | 370/231 |
| 7,188,138 B1* | 3/2007 | Schneider | 709/203 |
| 7,194,553 B2 | 3/2007 | Lucco et al. | |
| 7,200,658 B2 | 4/2007 | Goeller et al. | |
| 7,296,155 B1 | 11/2007 | Trostle et al. | |
| 7,336,613 B2 | 2/2008 | Lloyd et al. | |
| 7,337,219 B1 | 2/2008 | Meenan et al. | |
| 7,343,397 B2 | 3/2008 | Kochanski | |
| 7,437,494 B2 | 10/2008 | Ellerbrock | |
| 7,522,931 B2* | 4/2009 | Ranalli et al. | 455/518 |
| 7,627,658 B2* | 12/2009 | Levett et al. | 709/223 |
| 7,702,760 B2* | 4/2010 | Latvakoski et al. | 709/221 |
| 7,792,836 B2* | 9/2010 | Taswell | 707/737 |
| 2001/0015965 A1 | 8/2001 | Preston et al. | |
| 2002/0049842 A1 | 4/2002 | Huetsch et al. | |
| 2002/0103898 A1 | 8/2002 | Moyer et al. | |
| 2002/0103931 A1* | 8/2002 | Mott | 709/245 |
| 2002/0143991 A1 | 10/2002 | Chow et al. | |
| 2002/0150094 A1 | 10/2002 | Cheng et al. | |
| 2002/0184236 A1 | 12/2002 | Donath et al. | |
| 2002/0188842 A1 | 12/2002 | Willeby | |
| 2003/0018694 A1 | 1/2003 | Chen et al. | |
| 2003/0023675 A1 | 1/2003 | Ouchi et al. | |
| 2003/0177211 A1 | 9/2003 | Cyr et al. | |
| 2004/0010553 A1 | 1/2004 | Katz et al. | |
| 2004/0179481 A1* | 9/2004 | Graupner | 370/254 |
| 2004/0215823 A1 | 10/2004 | Kleinfelter et al. | |
| 2004/0218747 A1* | 11/2004 | Ranalli et al. | 379/218.01 |
| 2005/0174998 A1 | 8/2005 | Vesterinen et al. | |
| 2006/0020684 A1 | 1/2006 | Mukherjee et al. | |
| 2006/0209885 A1 | 9/2006 | Hain et al. | |
| 2006/0224886 A1 | 10/2006 | Cohen et al. | |
| 2006/0242227 A1 | 10/2006 | Rao et al. | |
| 2006/0265508 A1 | 11/2006 | Angel et al. | |
| 2006/0280192 A1 | 12/2006 | Desanti | |
| 2007/0027925 A1 | 2/2007 | Spencer et al. | |
| 2007/0058621 A1* | 3/2007 | Okmianski et al. | 370/389 |
| 2007/0078988 A1 | 4/2007 | Miloushev et al. | |
| 2007/0088750 A1 | 4/2007 | Dumas et al. | |
| 2007/0136413 A1* | 6/2007 | Ishikawa et al. | 709/200 |
| 2007/0234061 A1 | 10/2007 | Teo | |
| 2007/0255848 A1 | 11/2007 | Sewall et al. | |
| 2008/0016233 A1* | 1/2008 | Schneider | 709/230 |
| 2008/0101358 A1 | 5/2008 | Van Ewijk et al. | |
| 2008/0140847 A1 | 6/2008 | Almog | |
| 2008/0151778 A1* | 6/2008 | Venkitaraman et al. | 370/254 |
| 2008/0165783 A1 | 7/2008 | Desanti | |
| 2009/0203331 A1* | 8/2009 | Ranalli et al. | 455/90.2 |
| 2009/0214018 A1* | 8/2009 | Tsai | 379/220.01 |
| 2009/0285120 A1* | 11/2009 | Swan | 370/254 |

FOREIGN PATENT DOCUMENTS

| | | |
|---|---|---|
| WO | WO01/58111 | 8/2001 |
| WO | WO2007/089217 | 8/2007 |

OTHER PUBLICATIONS

Hinden, R., et al., "RFC 3513—Internet Protocol Version 6 (IPv6) Addressing Architecture," [online] The Internet Society, 2003 [retrieved on Mar. 17, 2008] Retrieved from the Internet: <URL: http://www.rfc-archive.org/getrfc.php?rfc=3513> 23 pages.

Deering, S., et al., "RFC 4007—IPv6 Scoped Adress Architecture," [online] The Internet Society, 2005 [retrieved on Mar. 17, 2008] Retrieved from the Internet: <http://www.rfc-archive.org/getrfc.php?rfc=4007> 22 pates.

Haberman, et al., "Routing of Scoped Addresses in the Internet Protocol Version 6," [online] The Internet Society, Feb. 2000 [retrieved on Aug. 8, 2007] Retrieved from the Internet: <URL: http://www.draft-ietf-ipngwg-scoped-routing-03.txt> 13 pages.

Jung, J., "DNS Performance and the Effectiveness of Caching," IEEE/ACM Transactions on Networking, vol. 10, No. 5, Oct. 2002, 15 pages.

Smith, "Geolocation: Core to the Local Space and Key to Click-Fraud Detection," [online] Chris Silver Smith, Aug. 31, 2007 [retrieved on Aug. 31, 2007] Retrieved from the Internet: <URL: http://searchengineland.com/070813-082025.php> 6 pages.

McCurley, "Geospatial Mapping and Navigation of the Web," Proceeding of the 10th International Conference on the World Wide Web; pp. 221-229; May 1, 2001.

Hardie, et al., "LoST: A Region-to-Service Translation Protocol," [online] The Internet Society, Jun. 16, 2006, Retrieved from the Internet: <URL: wwwdraft-ietf-ecrit-lost-00.txt>, 32 pages.

LeFebvre, W., et al., "Rapid Reverse DNS Lookups For Web Servers," Proceedings of the 2nd Conference on USENIX Symposium on Internet Technologies and Systems, Oct. 11-14, 1999, Boulder, CO, vol. 2, 11 pages.

Davis, et al., "RFC 1876—A Means for Expressing Location Information in the Domain Name System," [online] The Internet Society, Jan. 1996 [retrieved Jan. 11, 2007] Retrieved from the Internet: <URL: http://www.zytrax.com/books/dns/apd/rfc1876.txt>, 12 pages.

Day, M., et al., RFC 2778, "A Model for Presence and Instant Messaging" [online] The Internet Society, Feb. 2000 [retrieved on May 6, 2005]; Retrieved from the Internet: <URL:http://www.ietf.org/rfc/rfc2778.txt?number=2778>, 14 pages.

Day, M., et al., RFC 2779, "Instant Messaging / Presence Protocol Requirements" [online] The Internet Society, Feb. 2000 [retrieved on May 6, 2005];Retrieved from the Internet: <URL:http://www.ietf.org/rfc/rfc2779.txt>, 22 pages.

Rosenberg, et al., "Session Initiation Protocol (SIP) Extensions for Presence," [online] IETF Working Document, May 20, 2002 [retrieved on Feb. 3, 2009] Retrieved from the Internet: <URL: http://tools.ietf.org/html/draft-ietf-simple-presence-07>, 27 pages.

Mosveen, C., et al., "UniCollab: Evaluation And Requirements For Re-Engineering," NTNU, Aug. 2005 [retrieved on Apr. 5, 2006]; Retrieved from the Internet: <URL:http://www.idi.ntnu.no/grupper/su/fordypningsprosjekt-2005/mosveen-brustad-fordyp05.pdf>, pp. 34, 37, 42-43 and 73-80.

* cited by examiner

METHODS AND SYSTEMS FOR RESOLVING A FIRST NODE IDENTIFIER IN A FIRST IDENTIFIER DOMAIN SPACE TO A SECOND NODE IDENTIFIER IN A SECOND IDENTIFIER DOMAIN SPACE

RELATED APPLICATIONS

This application is related to U.S. patent application Ser. No. 11/962,285, titled "Methods And Systems For Sending Information To A Zone Included In An Internet Network", filed on Dec. 21, 2007, the entire disclosure of which is here incorporated by reference.

BACKGROUND

Messages including information for accessing a network resource based on a node name are commonly exchanged. The recipient of such a message must, when given a node name, resolve the node name to a network address before network communication with the node can be attempted. To accomplish the resolving, a lookup commonly takes place. Lookups of names in domains remote from the node requesting the lookup can take a significant amount of time due to the need to route the resolution request through the DNS or other network directory system in order to find a node that can resolve the name. While caching of previous lookups is performed currently to improve subsequent requests, caching of a previous lookup does not improve the efficiency of making an initial request.

Accordingly, there exists a need for methods, systems, and computer program products for resolving a first node identifier in a first identifier domain space to a second node identifier in a second identifier domain space.

SUMMARY

Methods and systems are described for resolving a first node identifier in a first identifier domain space to a second node identifier in a second identifier domain space. In one aspect, a method for resolving a first node identifier in a first identifier domain space to a second node identifier in a second identifier domain space is disclosed. A first node identifier from a first identifier domain space is identified. The first node identifier is included in data for transmission to a recipient. A network directory service node address is determined for a network directory service node configured to resolve the first node identifier to a second node identifier in a second identifier domain space. A message including the data and addressed to the recipient is generated. The message is transmitted to the recipient in association with transmitting, to the recipient, the network directory service node address. At least one of the preceding actions is performed on at least one electronic hardware component According to an aspect, a system for resolving a first node identifier in a first identifier domain space to a second node identifier in a second identifier domain space is disclosed. The system includes system components including a content handler component configured to identify a first node identifier from a first identifier domain space, the first node identifier included in data for transmission to a recipient. The system also includes a resolver client component configured to determine a network directory service node address for a network directory service node configured to resolve the first node identifier to a second node identifier in a second identifier domain space. The system also includes a message generator component configured to generate a message addressed to the recipient, the message including the data. The system also includes a message transmitter component configured to transmit, to the recipient, the message in association with transmitting, to the recipient, the network directory service node address. At least one of the system components includes at least one electronic hardware component.

According to an aspect, a computer readable medium embodying a computer program, executable by a machine, for resolving a first node identifier in a first identifier domain space to a second node identifier in a second identifier domain space is disclosed. The computer program includes executable instructions for identifying a first node identifier from a first identifier domain space, the first node identifier included in data for transmission to a recipient. The computer program further includes executable instructions for determining a network directory service node address for a network directory service node configured to resolve the first node identifier to a second node identifier in a second identifier domain space. The computer program further includes executable instructions for generating a message addressed to the recipient, the message including the data. The computer program further includes executable instructions for transmitting, to the recipient, the message in association with transmitting, to the recipient, the network directory service node address.

In another aspect, a method for resolving a first node identifier in a first identifier domain space to a second node identifier in a second identifier domain space is disclosed. A message is received including a first node identifier in a first identifier domain space in association with receiving a node address of a network directory service node. The network directory service node is configured to resolve the first node identifier to a second node identifier in a second identifier domain space. A query including the first node identifier is generated. The query, addressed with the network directory service node address, is transmitted. A response is received including the second node identifier in the second identifier domain space.

According to an aspect, a system for resolving a first node identifier in a first identifier domain space to a second node identifier in a second identifier domain space is disclosed. The system includes system components including a message receiver component configured to receive a message including a first node identifier in a first identifier domain space in association with receiving a node address of a network directory service node configured to resolve the first node identifier to a second node identifier in a second identifier domain space. The system includes system components including a content handler component configured to generate a query including the first node identifier. The system includes system components including a resolver client component configured to transmit the query addressed with the network directory service node address and configured to receive a response including the second node identifier in the second identifier domain space. At least one of the system components includes at least one electronic hardware component.

According to an aspect, a computer readable medium embodying a computer program, executable by a machine, for resolving a first node identifier in a first identifier domain space to a second node identifier in a second identifier domain space is disclosed. The computer program includes executable instructions for receiving a message including a first node identifier in a first identifier domain space in association with receiving a node address of a network directory service node configured to resolve the first node identifier to a second node identifier in a second identifier domain space; The computer program includes executable instructions for generating a query including the first node identifier. The computer program includes executable instructions for transmitting the query addressed with the network directory service node address. The computer program includes executable instructions for receiving a response including the second node identifier in the second identifier domain space.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
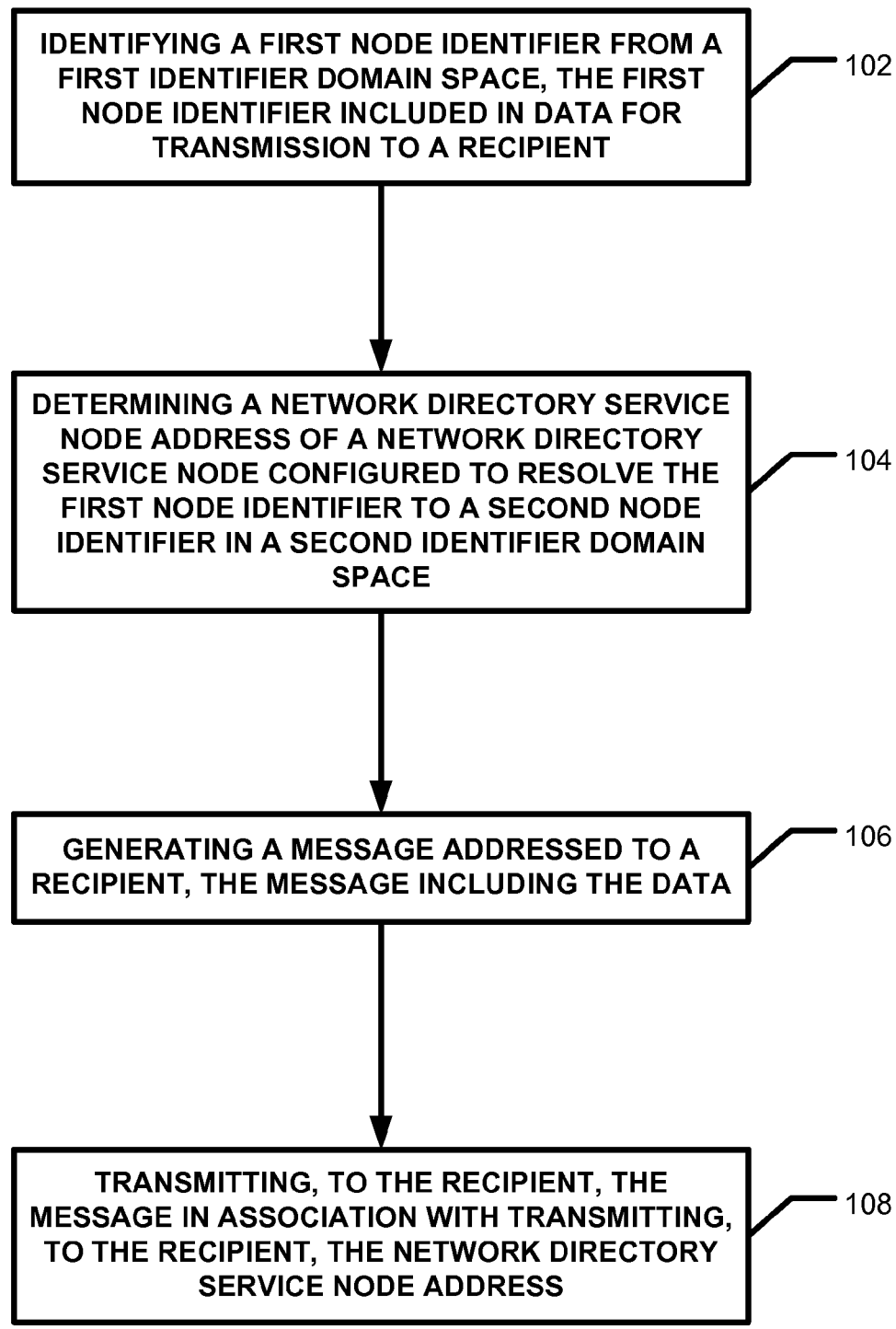
FIG. 1 is a flow diagram illustrating a method for resolving a first node identifier in a first identifier domain space to a second node identifier in a second identifier domain space according to an embodiment of the subject matter described herein.
Figure 2:
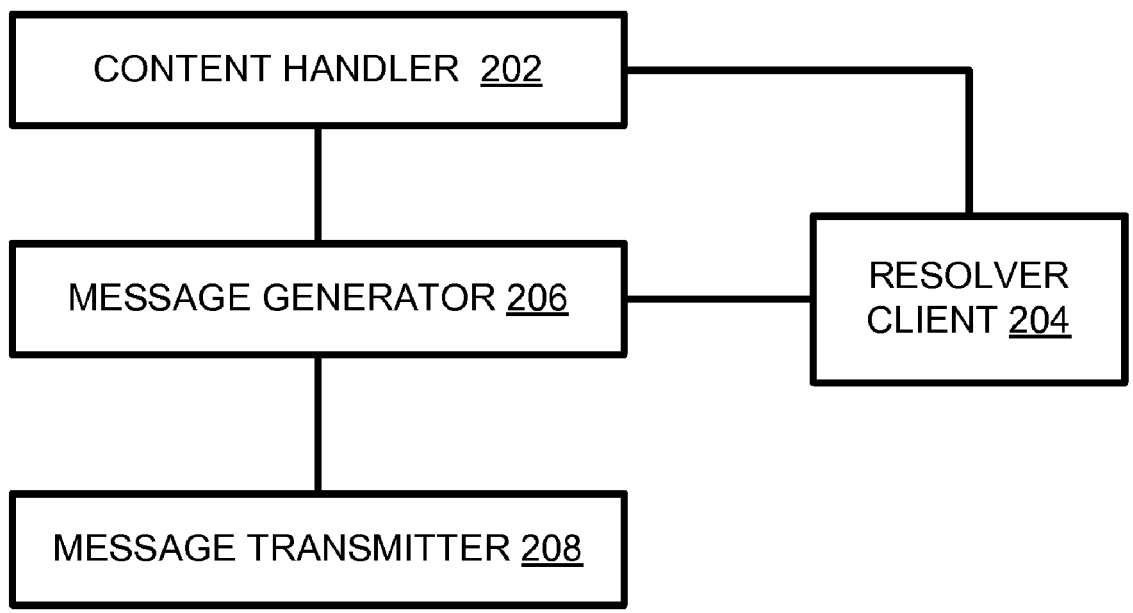
FIG. 2 is a block diagram illustrating a system for resolving a first node identifier in a first identifier domain space to a second node identifier in a second identifier domain space according to another embodiment of the subject matter described herein.
Figure 3:
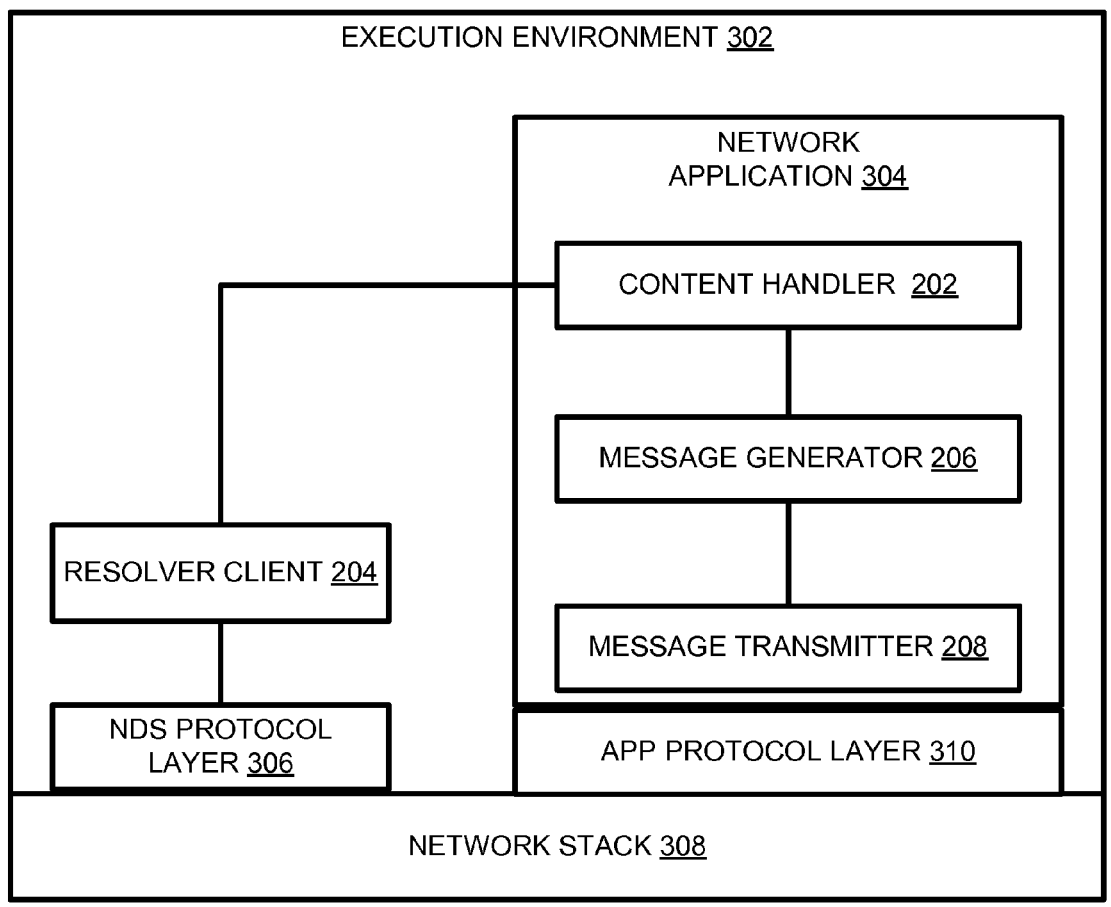
FIG. 3 is a block diagram illustrating an exemplary execution environment for a system for resolving a first node identifier in a first identifier domain space to a second node identifier in a second identifier domain space according to another embodiment of the subject matter described herein.

FIG. 1 is a flow diagram illustrating a method for resolving a first node identifier in a first identifier domain space to a second node identifier in a second identifier domain space according to an exemplary embodiment of the subject matter described herein. FIG. 2 is a block diagram illustrating a system for resolving a first node identifier in a first identifier domain space to a second node identifier in a second identifier domain space according to another exemplary embodiment of the subject matter described herein. The method illustrated in FIG. 1 can be carried out by, for example, some or all of the components illustrated in the exemplary system of FIG. 2. FIG. 3 illustrates the components illustrated in FIG. 2, among others, in an exemplary execution environment.

With reference to FIG. 1, in block 102 a first node identifier from a first identifier domain space is identified. The first node identifier is included in data for transmission to a recipient. Accordingly, a system for resolving a first node identifier in a first identifier domain space to a second node identifier in a second identifier domain space includes means for identifying a first node identifier from a first identifier domain space, the first node identifier included in data for transmission to a recipient. For example, as illustrated in FIG. 2, a content handler component 202 is configured for identifying a first node identifier from a first identifier domain space, the first node identifier included in data for transmission to a recipient.

FIG. 3 illustrates the content handler component 202 configured to identify a node identifier included in data processed by the content handler component 202. The content handler component 202 is illustrated, according to an exemplary aspect, as operating in an execution environment 302 as a component of a network application 304. The execution environment 302 can be hosted by a node. For example, a sender node 402 in communication with a network 404 as illustrated in FIG. 4 can host the execution environment.

Figure 4:
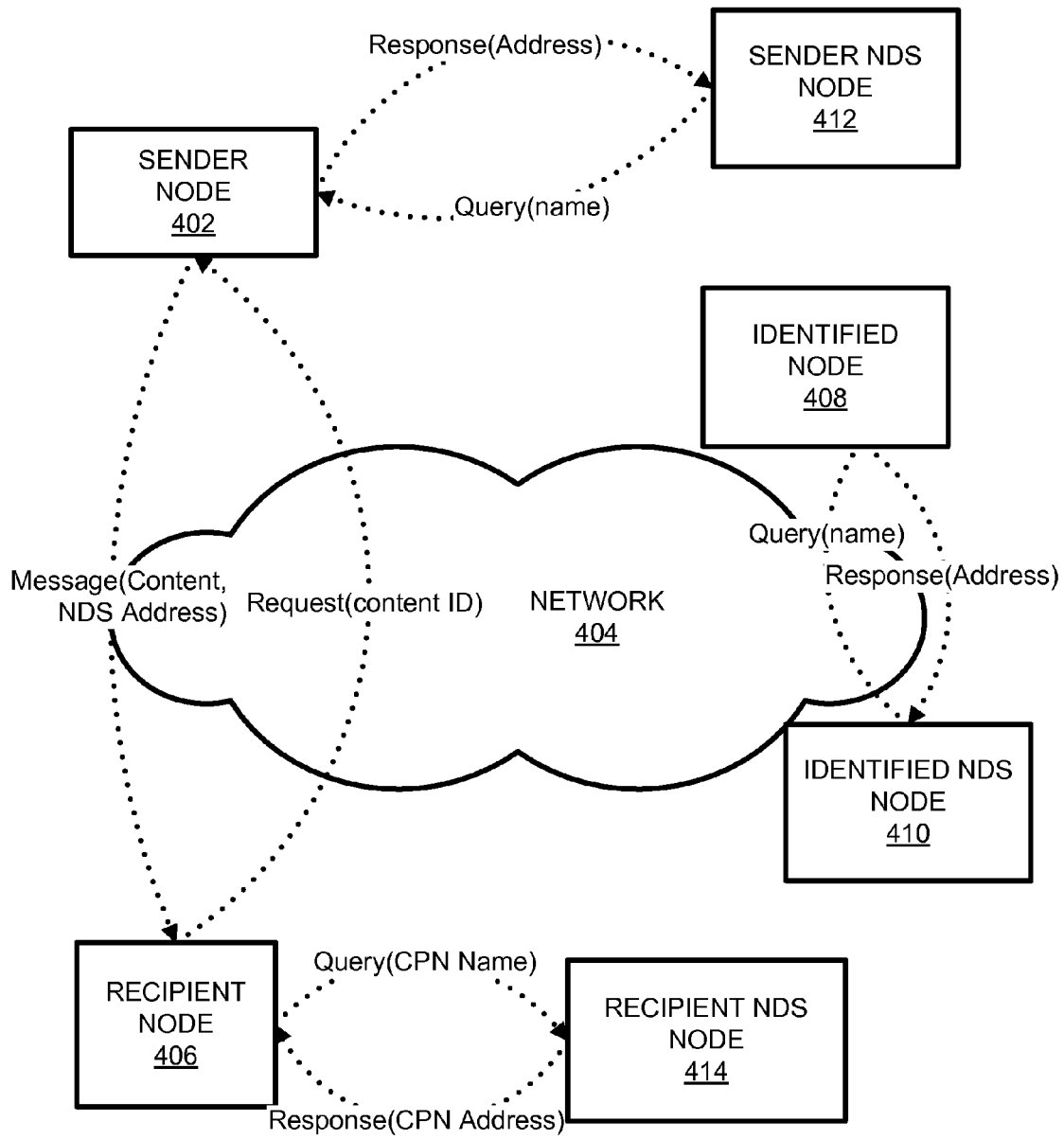
FIG. 4 is a message flow diagram illustrating an exemplary message flow for a method for resolving a first node identifier in a first identifier domain space to a second node identifier in a second identifier domain space according to another embodiment of the subject matter described herein.

For example, the network application 304 can be a server application configured to transmit data to a recipient, such as a recipient node 406 illustrated in FIG. 4. A recipient can operate in a role such as that of a client, a server, and/or peer with respect to the network application 304 in the sender node 402. Exemplary server applications include a web application operating in a web server environment, a pub-sub server for sending asynchronous messages, an event/notification server, a messaging server such as an email server, a streaming server such as a media server, and the like.

According to another aspect, the network application 304 can be a client application operating in the sender node 402 configured to transmit data to another node. For example, a client, peer, and/or a server in the recipient node 406, that can be the node receiving the data from the sender node 402. Exemplary client applications include a web browser, a pub-sub client such as a presence client for receiving asynchronous messages, an event/notification client such as a Simple Network Management Protocol (SNMP) alerter, a messaging client such as an email, Instant Messaging (IM), and/or Short Messaging Service (SMS) client, a media player configured to request and process a media stream, and the like.

As stated above, the content handler component 202 is configured for identifying the first node identifier in data for transmission to a recipient. According to an aspect, the first node identifier can includes a symbolic name from a domain name service (DNS) name space. For example, the content handler component 202 can be configured to identify the first node identifier including a symbolic name from a domain name service name space.

For example, the node identifier in the data can be a symbolic name such any of a host name (oberlin.nc.sceneralabs.com) identifying a node, such an identified node 408 illustrated in FIG. 4 as in communication with the network 404, a geospatial identifier (name or network address), a network address, and a postal address. The node identifier can be included in a first domain of a first identifier space, such as the domain "sceneralabs.com" in the Internet domain name space. The node identifier in the data can have at least one associated second identifier from a second identifier space. For example, the name, oberlin.nc.scenerlabs.com, can be associated with an Internet Protocol (IP) address, 168.3.14.101. The IP address can be assigned to a network interface of the identified node 408, oberlin.nc.sceneralabs.com. A record associating the name and the network address can be stored in a network directory service, as illustrated by an identified Network Directory Service (NDS) node 410 configured, for example, to represent the domain sceneralabs.com in the DNS name space and/or in a record in a DNS service representing a domain as a subnet of the internet identified by the subnet/mask pair 168.3.14.0/24 in the IP address space. Exemplary network directory services include DNS services and Lightweight Directory Access Protocol (LDAP) services.

A node identifier can have a network context or scope in which it can be interpreted. Thus a node identifier can be a complete node identifier or a portion of a node identifier identifying a node with a scope determinable by a sender node 402 and/or the recipient node 406. For example, the name "oberlin" identifies a unique node within the scope of the network naming domain, nc.sceneralabs.com. The identified node 408 illustrated in FIG. 4 can be identified by the name "oberlin" with the scope of its domain "nc.sceneralabs.com" In another aspect, the first node identifier can be an outside scope identifier. For example, the content handler component 202 can be configured to identify the first node identifier as an outside scope identifier. The operation of outside scope identifiers is described in related U.S. patent application Ser. No. 11/962,285, titled "Methods And Systems For Sending Information To A Zone Included In An Internet Network."

The node identifier can be in data that is generated by the content handler component 202 and/or other component of the network application 304, retrieved from a data store (not shown) accessible to the network application 304, received from component external to the network application 304 and operating in the execution environment 302, and/or received from another network node for processing and forwarding.

According to an aspect, the data can be included in at least one of a header portion and a payload portion of a message for transmission to the recipient. For example, the content handler component 202 is configured to identify the first node identifier in the data included in at least one of a header portion and a payload portion of a message for transmission to the recipient. For example, the data can be included as content in a payload portion of a message. According to another example, the data can be included a message or any portion of a message such as a header field or a trailer.

In another aspect, the data can include markup language based data including the first node identifier as a markup language element of the markup language based data. For example, the content handler component 202 can be configured to identify the first node identifier in the data including markup language based data including the first node identifier as a markup language element of the markup language based data. In Example 1 (described in greater detail below, as is a second example, Example 2), markup language based data that can be processed by content handler component 202 of the network application 304 operating in the sender node 402 is presented.

Example 1

```
<ul id="A">
    <li><a href="http://oberlin.nc.sceneralabs.com/">My
    Home Page</a></li>
    <li><a href="http://172.98.230.1/">Mail</a></li>
</ul>
```

As stated above, the content handler component 202 can be a component of a web application (i.e. the network application 304) processing the markup language based data in response to a request from a client operating in the recipient node 406. Alternatively, the content handler component 202 can be a component of a publish-subscribe service (i.e. the network application 304) processing the markup language based data to be sent in an asynchronous notification message to a publish-subscribe client operating in the recipient node 406. According to another aspect, the content handler component 202 can be a component of a browser (i.e. the network application 304) processing the data to be sent in a Hypertext Transfer Protocol (HTTP) message (such as a HTTP POST message) to a HTTP server operating in the recipient node 406.

Returning to FIG. 1, in block 104 a network directory service node address for a network directory service node configured to resolve the first node identifier to a second node identifier in a second identifier domain space is determined. Accordingly, a system for resolving a first node identifier in a first identifier domain space to a second node identifier in a second identifier domain space includes means for determining a network directory service node address for a network directory service node configured to resolve the first node identifier to a second node identifier in a second identifier domain space. For example, as illustrated in FIG. 2, a resolver client component 204 is configured for determining a network directory service node address for a network directory service node configured to resolve the first node identifier to a second node identifier in a second identifier domain space.

Returning to FIG. 3, the resolver client component 204 is illustrated operating in the execution environment 302 as a component external to the network application 304. Alternatively, a resolver client component 204 can be included in the network application 304 and/or can operate as an arrangement of components with a component included in the network application 304 and a component operating external to the network application 304. A node address, such as the network directory service node address that is determined, is a node identifier from a network address space such the IP address space. The node address can be a network address (either complete or scoped), can be from a symbolic identifier domain space such as the DNS name space, and/or can be from a geospatial domain space either including geospatial network addresses or geospatial symbolic identifiers.

In another aspect, determining the network directory service node address includes determining at least a portion of a domain portion of the first node identifier is shared by the node performing the determination, wherein the network directory service node is a default network directory service node and the network directory service node address is cached on the node performing the determination. For example, the resolver client component 204 can be configured to determine at least a portion of a domain portion of the first node identifier that is shared by the node performing the determination, wherein the network directory service node is a default network directory service node and the network directory service node address is cached on the node performing the determination.

Referring to FIG. 4, the resolver client component 204 can determine a node address of a NDS node, such as the identified NDS node 410 configured to resolve the first node identifier of the identified node 408 to a second node identifier of the identified node 408 in a second identifier space, such as a network address space. The identified NDS node 410 can be configured to represent a domain including the node identifier identified in the data. The identified NDS node 410 can be configured to cache the node identifier. The identified NDS node 410 can be determined to be "closer" to the identified node 408 based on a particular measure such as any of a network path length, network path bandwidth, latency, reliability, security, geographic distance, and cost. Further, the identified NDS node 410 can have a specified relationship to the identified node 408 such as a NDS node representing a parent domain of a domain including a node identifier of the identified node 408.

FIG. 4 illustrates the sender node 402 that hosts the execution environment 302 or an analog and the network application 304, such as a web server application and/or an email client application. The content handler component 202 of the network application 304 can identify a node identifier, "oberlin.nc.sceneralabs.com", in a first domain, "sceneralabs.com" in a first domain space, such as the DNS name space in data processed by the content handler component 202. The identified node identifier can be included in a link in a web page to be sent by the network application 304 operating as a web server application on the sender node 402, as a parameter in a remote procedure call (RPC) from the network application 304 operating as a client application on the sender node 402 of a remote service, in a message header such as an Hypertext Transfer Protocol (HTTP) content header identifying "oberlin" in a redirect response received by the network application 304 as a web application server in a response message to an HTTP GET or POST message sent by a web browser.

In another aspect, determining the network directory service node address includes receiving configuration data including node address information identifying the network directory service node address. For example, the resolver client component 204 can be configured to receive configuration data including node address information identifying the network directory service node address. The node address of the identified NDS node 410 can be determined from configuration data received as input from a user and/or another component operating in the execution environment 302. The resolver client component 204, for example, can be configured to lookup the node address of the identified NDS node 410 in a data store locally accessible to the sender node 402 hosting the network application 304.

In another aspect, determining the network directory service node address includes presenting a user interface configured to receive node address information identifying the network directory service node address. For example, the resolver client component 204 can be configured to provide for presenting a user interface configured to receive node address information identifying the network directory service node address. According to an aspect, the resolver client component 204 can be configured to present or invoke another component for presenting a user interface to receive node address information identifying the node address of the identified NDS node 410. Alternatively or additionally, the node address of the identified NDS node 410 can be received via the network 406 from a remote configuration server such as a Dynamic Host Configuration Protocol (DHCP) server (not shown).

In another aspect, determining the network directory service node address includes generating a query message based on the first node identifier, transmitting the query message to a default network directory service node, and receiving a response including node address information identifying the network directory service node address. For example, a NDS protocol layer 306 can be configured to generate a query message based on the first node identifier. The NDS protocol layer 306 can be further configured to transmit the query message to a default network directory service node. The NDS protocol layer 306 can be further configured to receive a response including node address information identifying the network directory service node address.

For example, the resolver client component 204 can be configured to generate and transmit a query message including at least a portion of the identified node identifier to a network directory service such as a DNS server or an LDAP server, as illustrated by a sender NDS node 412. FIG. 3 illustrates an NDS protocol layer 306 provided in the execution environment 302 and configured to communicate with an NDS node with a protocol supported by both the NDS protocol layer 306 and an NDS node. The resolver client component 204 can provide the query or query information to the NDS protocol layer 306. The NDS protocol layer 306 can be configured to format the query in one or more messages to be sent to an NDS node. The NDS protocol layer 306 illustrated in FIG. 3 can be in communication with the network 404 by a network stack 308 configured to transmit data over the network 404 to an NDS node identified by a node address. A response to the query, for example sent from the sender NDS node 412, can identify the node address of the identified NDS node 410 configured to resolve the identified node identifier. The response can be received from the network 404 via the network stack 308 and received by the NDS protocol layer 306. The NDS protocol layer can provide the node address of the identified NDS node 410 received in the response to the resolver client component 204.

A resolver client component 204 can provide a determined node address of an NDS node to a component that invoked the resolver client component. In FIG. 3 the content handler component 202 is illustrated as invoking the resolver client component 204 to determine the node address of the identified NDS node 410. Alternatively, another component of the network application 304 included in the sending or processing of the data including the identified node identifier can invoke the resolver client component 204 and receive the node address of the identified NDS node 410. Alternatively, the resolver client component 204 can be invoked by a first component of the network application, such as the content handler component 202 and provide the determined node address of the identified NDS node 410 to another component of the network application 304 such as a message generator component 206.

Returning to FIG. 1, in block 106 a message is generated that is addressed to the recipient. The message includes the data. Accordingly, a system for resolving a first node identifier in a first identifier domain space to a second node identifier in a second identifier domain space includes means for generating a message addressed to the recipient, the message including the data. For example, as illustrated in FIG. 2, the message generator component 206 is configured to generate a message addressed to the recipient, the message including the data.

Returning to FIG. 3, the message generator component 206 is illustrated operating in the execution environment 302 as a component of the network application 304. Alternatively, a message generator component 206 can be included in the network application 304 and/or can operated as an arrangement of components with a component included in the network application 304 and a component operating external to the network application 304. As stated above, the message generator component 206 is configured to generate a message. The generated message includes the data that included the identified node identifier. The generated message is addressed to the recipient. In FIG. 4, the sender node 402 is illustrated as hosting the network application 304 including the message generator component 206 that can generate a message addressed to the recipient node 406 to transmit the content to the recipient node 406.

As discussed above the message can be any of a request message, a response message, an asynchronous message (such as a notification in a pub-sub system) solicited (for example by subscribing), or unsolicited, an email, an IM message, an SMS message, and an event/notification message from a Simple Network Management Protocol (SNMP) alerter, and the like. Accordingly, the message generator component 206 can be configured to generate a message such as any of a request message, a response message, an asynchronous message (such as a notification in a pub-sub system) solicited (for example by subscribing), or unsolicited, an email, an IM message, an SMS message, and an event/notification message from a Simple Network Management Protocol (SNMP) alerter, and the like.

Returning to FIG. 1, in block 108 the message is transmitted, to the recipient, in association with transmitting, to the recipient, the network directory service node address. Accordingly, a system for resolving a first node identifier in a first identifier domain space to a second node identifier in a second identifier domain space includes means for transmitting, to the recipient, the message in association with transmitting, to the recipient, the network directory service node address. For example, as illustrated in FIG. 2, a message transmitter component 208 is configured to transmit, to the recipient, the message in association with transmitting, to the recipient, the network directory service node address.

FIG. 3 illustrates the message transmitter component 208 configured to transmit the node address of the identified NDS node 410 to the recipient in association with sending the generated message including the data. The generated message can be sent by the sender node 402 based on a communications protocol between the sender node 402 and the recipient node 406 over the network 404. The protocol can be a protocol supported by a portion of the network stack 308, such as an IP protocol including User Datagram Protocol (UDP) and/or Transmission Control Protocol (TCP). FIG. 3 illustrates an application protocol layer 310 configured to format the message to transmit to the recipient node 406. The message transmitter component 208 can provide the message in whole or in parts to the application protocol layer 310. The application layer 310 can transmit the message in whole or in parts via the network 404 by interoperating with the network stack 308 in communication with the network 404 as described above.

According to an aspect, transmitting, to the recipient, the message in association with transmitting, to the recipient, the network directory service node address includes transmitting, to the recipient, a second message associated with the message, the second message including the network directory service node address. For example, the message transmitter component 208 is configured to transmit, to the recipient, the message in association with transmitting, to the recipient, the network directory service node address includes transmitting, to the recipient, a second message associated with the message, the second message including the network directory service node address.

The node address of the identified NDS node 410 can be sent in a second message that is associated with the generated message. The second message can be generated by the message generator component 206 illustrated in FIG. 3 and/or the message transmitter component 208. The message including the data and the message including the node address can be associated based on a correlator in each message, a network endpoint identifiable as a common endpoint for sending the messages from the sender node 402 and/or for receiving the messages by the recipient node 406, a session protocol using a common connection for transmitting both messages, a time associated with the messages, and various other manners for associating the messages.

In another aspect, transmitting, to the recipient, the message in association with transmitting, to the recipient, the network directory service node address includes transmitting, to the recipient, the message including the network directory service node address. For example, the message transmitter component 208 can be configured to transmit, to the recipient, the message in association with transmitting, to the recipient, the network directory service node address includes transmitting, to the recipient, the message including the network directory service node address. The node address can be included in any portion of the message including a header, trailer, and/or payload.

Returning to Example 1 from above, the markup is HTML markup specifying an unnumbered list with two list items. The first list item specifies a Uniform Resource Locator (URL), http://oberlin.nc.sceneralabs.com, in a link presented as "My Home Page". In order to access the identified resource, the recipient node 406 must resolve the node identifier "oberlin.nc.sceneralabs.com" to a network address, such the IP address, 168.3.14.101, in order to address a message to transmit to the identified node 408. The message transmitted above includes the node identifier, "oberlin.nc.sceneralabs.com" to be resolved to the IP address. The recipient node 406 and a default NDS node 414 in many, if not most cases, are not in the same naming domain as the identified node 408. In a federated NDS system, such as DNS and/or LDAP, the message is routed or relayed through one or more nodes until is received by an NDS node, such as the identified NDS node 410 in FIG. 4, configured to resolve the node identifier in the first name space (the DNS name space) to a node identifier in a second identifier space (the IP network address space).

While the node identifier in a link in the second list item does not require resolution to another node identifier in order to transmit a message, a second node identifier identifying a DNS naming domain can be used in, for example, validating a certificate received from the node identified by 172.98.230.1. Alternatively or additionally, a geospatial identifier or location associated with the identified node can be used for authorization or presenting location information as metadata to a user. For these reasons as well as others, a node identifier in a network address identifier space may need to be resolved to a node identifier in a second identifier space. As with resolution of "oberlin.nc.sceneralabs.com" to 168.3.14.101, a query including the network address is sent to the NDS node 410 which can require routing through multiple nodes in an NDS system to an NDS node configured to resolve the received network identifier from a first identifier space to a second network identifier in a second identifier space.

Example 2 illustrates a second exemplary markup language based data including a node address of an NDS node configured to resolve each of the node identifiers in the list items to corresponding second identifiers.

Example 2

```
<ul id="A">
    <dns href="dns://168.3.14.2">
```

```
        <li><a href="http://oberlin.nc.sceneralabs.com/">My
            Home Page</a></li>
        </dns>
        <dns href="dns://172.98.128">
            <li><a href="http://172.98.230.1/">Mail</a></li>
        </dns>
    </ul>
```

A <dns> element is included that can be defined to identify a node address of an NDS node configured to resolved any network identifiers included in a <dns> element. Example 2 illustrates a node address 168.3.14.2 as a node address of, for example, the identified NDS node 410, configured to resolve the node identifier "oberlin.nc.sceneralabs.com" to its corresponding IP address in the IP address space. The node address is formatted as a URL conforming to a DNS schema identifying the DNS protocol for communication with the identified NDS node 410. A query to resolve the node identifier oberlin.nc.sceneralabs.com can be sent addressed to the identified NDS node 410 bypassing routing the query through the default NDS node 414 and any other NDS nodes included in routing the query message. A second <dns> element can be interpreted analogously. According to an aspect, in the second <dns> element a partial node identifier is included. A partial node identifier can be processed as a scoped identifier as described above. The scoped node address in Example 2 is an outside scope identifier as described above. The <dns> element can be included in a schema specifying HTML and/or can be specified in a second schema for a markup language that can be used with HTML and/or other markup languages.

According to an aspect, a node address of an NDS node can be specified in an attribute of a markup language; can be specified in a header of a message such as content header of an HTTP message and associated with a node identifier in the content via, for example, a common ID; can be specified by a Multipurpose Internet Mail Extensions (MIME) type, and/or can be specified using any other suitable mechanism.

Figure 5:
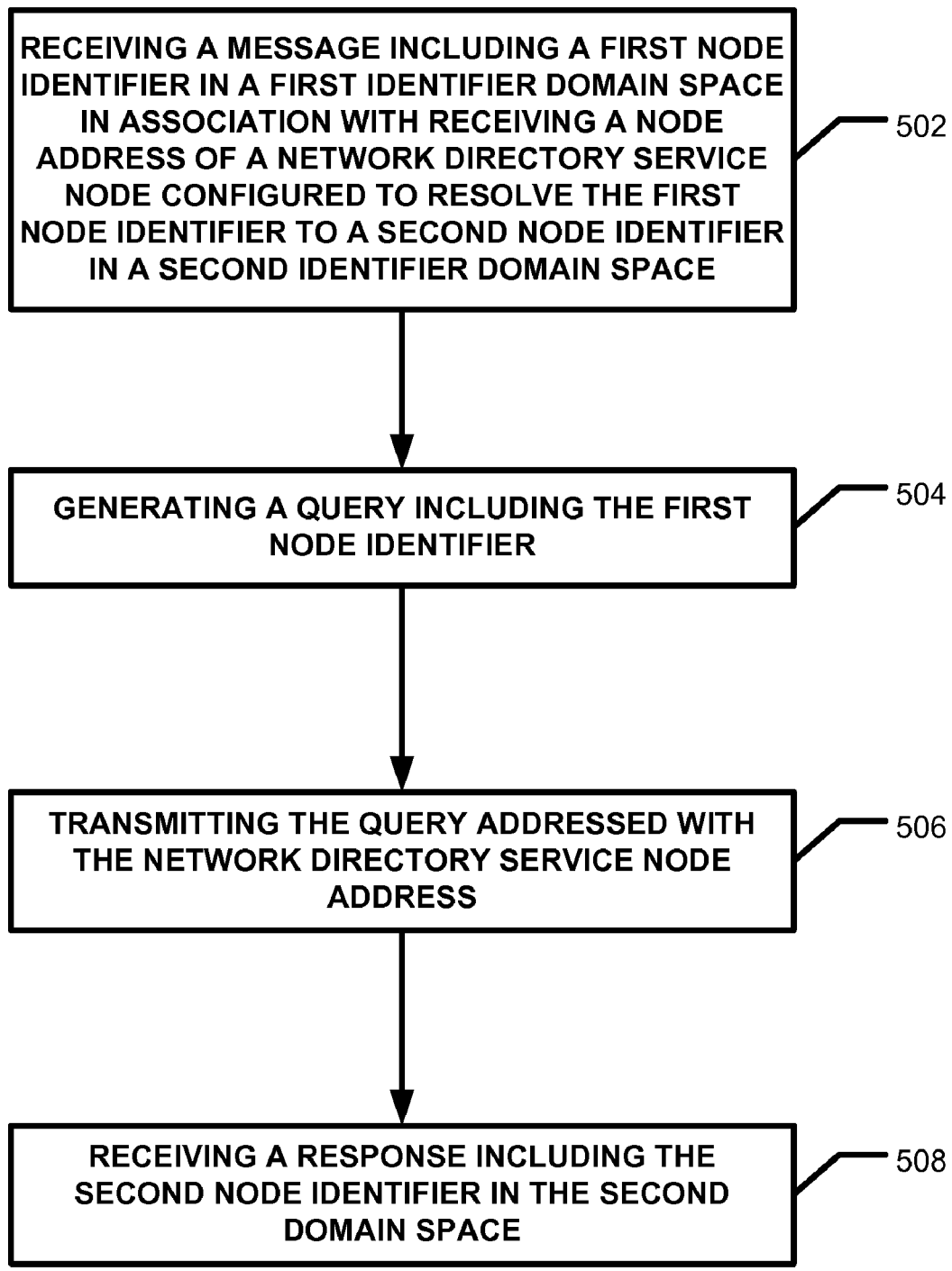
FIG. 5 is a flow diagram illustrating a method for resolving a first node identifier in a first identifier domain space to a second node identifier in a second identifier domain space according to an embodiment of the subject matter described herein.
Figure 6:
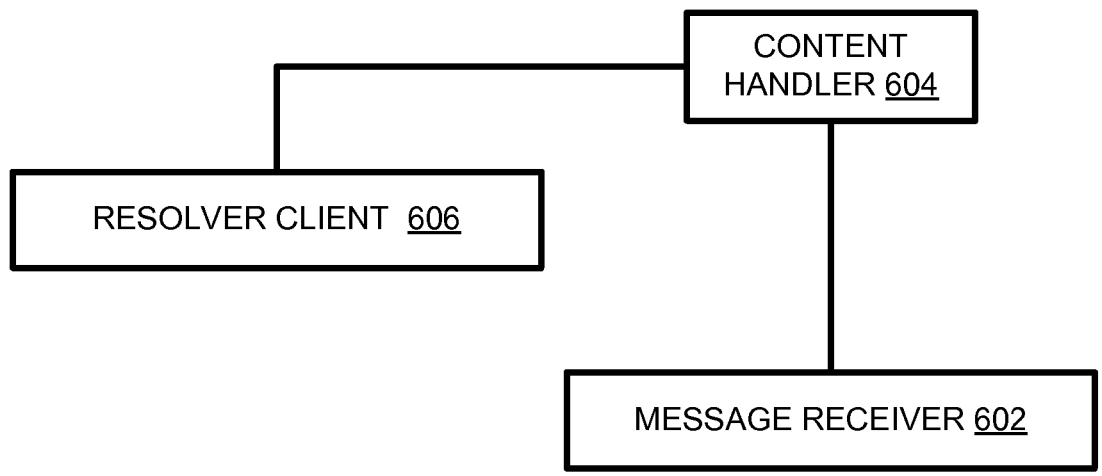
FIG. 6 is a block diagram illustrating a system for resolving a first node identifier in a first identifier domain space to a second node identifier in a second identifier domain space according to another embodiment of the subject matter described herein.
Figure 7:
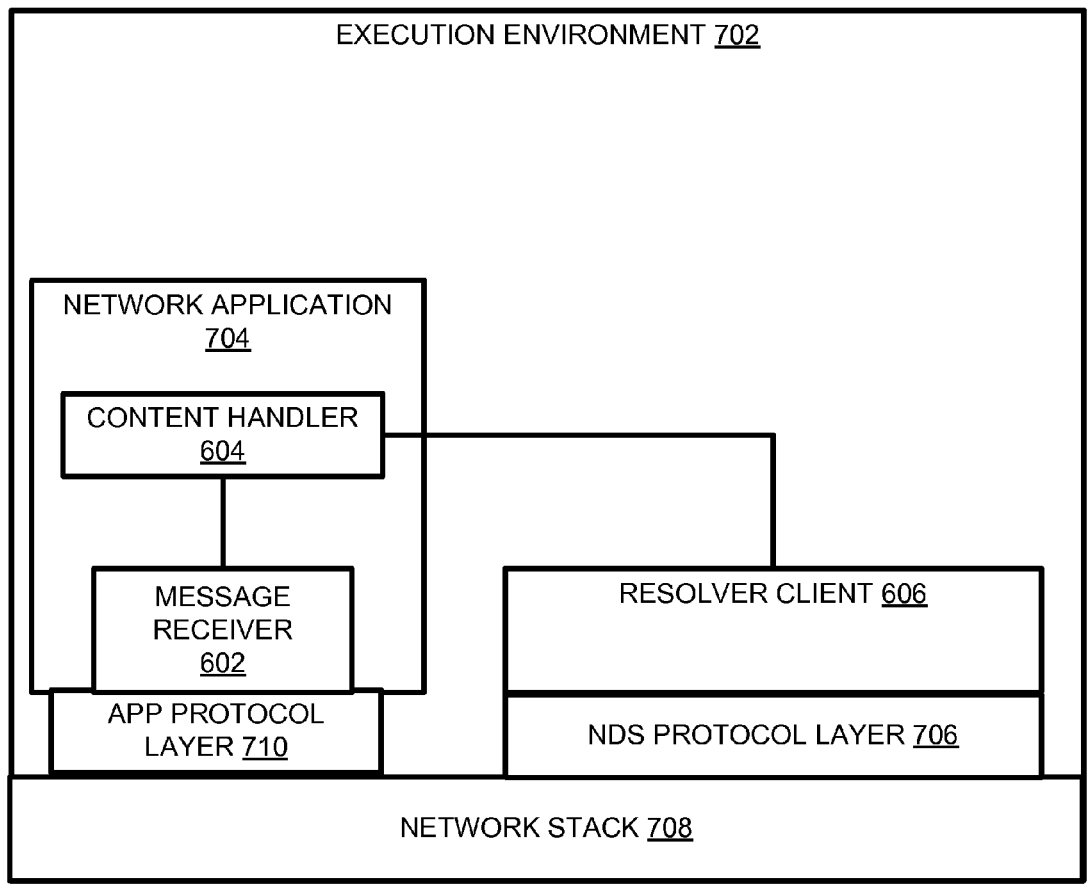
FIG. 7 is a block diagram illustrating an exemplary execution environment for a system for resolving a first node identifier in a first identifier domain space to a second node identifier in a second identifier domain space according to another embodiment of the subject matter described herein.

FIG. 5 is a flow diagram illustrating a method for resolving a first node identifier in a first identifier domain space to a second node identifier in a second identifier domain space according to an exemplary embodiment of the subject matter described herein. FIG. 6 is a block diagram illustrating a system for resolving a first node identifier in a first identifier domain space to a second node identifier in a second identifier domain space according to another exemplary embodiment of the subject matter described herein. The method illustrated in FIG. 5 can be carried out by, for example, some or all of the components illustrated in the exemplary system of FIG. 6. FIG. 7 illustrates the components illustrated in FIG. 6, among others, in an exemplary execution environment.

With reference to FIG. 5, in block 502 a message including a first node identifier in a first identifier domain space is received. The message is received in association with receiving a node address of a network directory service node configured to resolve the first node identifier to a second node identifier in a second identifier domain space. Accordingly, a system for resolving a first node identifier in a first identifier domain space to a second node identifier in a second identifier domain space includes means for receiving a message including a first node identifier in a first identifier domain space in association with receiving a node address of a network directory service node configured to resolve the first node identifier to a second node identifier in a second identifier domain space. For example, as illustrated in FIG. 6, a message receiver component 602 is configured to receive a message including a first node identifier in a first identifier domain space in association with receiving a node address of a network directory service node configured to resolve the first node identifier to a second node identifier in a second identifier domain space.

FIG. 7 illustrates the message receiver component 602 operating in an execution environment 702 and configured to receive a message including a node identifier in a first identifier space in association with receiving a node address of an NDS node configured to resolve the node identifier to a node identifier in a second identifier space. The execution environment 702 or an analog can be provided by a node, such as the recipient node 406 illustrated in FIG. 4. The message receiver component 602 is illustrated as a component of a network application 704.

For example, the network application 704 can be a server application. Exemplary server applications include a web application operating in a web server environment, a pub-sub server for sending asynchronous messages, an event/notification server, a messaging server such as an email server, a streaming server such as a media server, and the like. According to another aspect, the network application 704 can be a client application. Exemplary client applications include a web browser, a pub-sub client such as a presence client for receiving asynchronous messages, an event/notification client such as a Simple Network Management Protocol (SNMP) alerter, a messaging client such as an email, Instant Messaging (IM), and/or Short Messaging Service (SMS) client, a media player configured to request and process a media stream, and the like.

As discussed above the message can be any of a request message, a response message, an asynchronous message (such as a notification in a pub-sub system) solicited (for example by subscribing), or unsolicited, an email, an IM message, an SMS message, and an event/notification message from a Simple Network Management Protocol (SNMP) alerter, and the like. Accordingly, the message receiver component 602 can be configured to receive a message such as any of a request message, a response message, an asynchronous message (such as a notification in a pub-sub system) solicited (for example by subscribing), or unsolicited, an email, an IM message, an SMS message, and an event/notification message from a Simple Network Management Protocol (SNMP) alerter, and the like.

The message can be received by message receiver component 602 configured to receive messages based on an enabling communications between nodes over the network 404. The protocol can be a protocol supported by a portion of a network stack 708, such as an IP protocol including User Datagram Protocol (UDP) and/or Transmission Control Protocol (TCP). An application protocol layer 710 can receive the message in whole or in parts via the network 404 by interoperating with the network stack 708 in communication with the network as described above. Regardless of message type or message flow pattern the message can be received from a sender node 402 via the application protocol layer 710 from the network stack 708 in communication with the network 404.

According to an aspect, the recipient can receive the message in association with receiving a second message associated with the message, the second message including the network directory service node address. For example, the node address of the identified NDS node 410 can be received in a second message that is associated with the generated message. The message including the data and the message included the node address can be associated based on a correlator in each message, a network endpoint identifiable as a common endpoint for sending the messages from the sender node 402 and/or for receiving the messages by the recipient node 406, a session protocol using a common connection for transmitting both messages, and various other means for associating the messages known to those skilled in the art or not yet discovered including association by time.

In another aspect, a single message can be received. The single message can include the node address in addition to the data. The node address can be included in any portion of the message including a header, trailer, and/or payload.

According to an aspect, the first node identifier includes a symbolic name from a domain name service name space. For example, the message receiver component 602 can be configured to receive the first node identifier including a symbolic name from a domain name service name space. In another aspect, the first node identifier is an outside scope identifier. For example, the message receiver component 602 can be configured to receive the first node identifier as an outside scope identifier as described above.

Returning to FIG. 5, in block 504 generating a query including the first node identifier. Accordingly, a system for resolving a first node identifier in a first identifier domain space to a second node identifier in a second identifier domain space includes means for generating a query including the first node identifier. For example, as illustrated in FIG. 6, a content handler component 604 is configured to generate a query including the first node identifier.

A message can be processed by one or more components of the network application 704 before an attempt to resolve the node identifier in the first identifier space to a second node identifier in a second identifier space. FIG. 7 illustrates the content handler component 604 as an exemplary component configured to process the received message.

For example, the content handler component 604 can be included in a browser and can be associated with message data based on a MIME type of the data. For example, the content handler 604 can be configured to process text/html data can be included in the network application 704 to process the markup code in Example 2. The content handler 604 can receive an input indicating a link including a node identifier in the first domain space (see example links above in Example 2). The content handler component 604 in any of various adaptations as a component of the network application 704 can detect the node identifier and determine a need to resolve the node identifier. The specific content handler component 604 adaptation depends on the type of network application and the context in which the node identifier is processed.

The network application 704, depending on its purpose, can detect a node identifier and be configured to automatically determine that the node identifier is to be resolved to a second node identifier. Alternatively, the network application 704 can determine that resolution of a received node identifier is needed in response to an input from a user and/or another component, a configuration indicator, etc. In response to determining a need for resolving the node identifier from the first identifier space, the content handler component 604 generates a query including the node identifier in the first identifier space.

The content handler component 604 can be configured to detect the received node address of the identified NDS node 410 for resolving the node identifier in the first identifier space. The content handler component 604 can be configured to provide the node address of the identified NDS node 410 received in the message along with the generated query to a resolver client component 606. According to an aspect, the content handler component 604 can invoke the resolver client component 606 providing the node identifier and the node address. The resolver client component 606 can receive the provided information and generate a query including the received node identifier.

Returning to FIG. 5, in block 506 the query, addressed with the network directory service node address, is transmitted. Accordingly, a system for resolving a first node identifier in a first identifier domain space to a second node identifier in a second identifier domain space includes means for transmitting the query addressed with the network directory service node address. For example, as illustrated in FIG. 4, the resolver client component 606 is configured to transmit the query addressed with the network directory service node address.

The resolver client component 606 can transmit the query addressed to the identified NDS node 410 based on the received node address, bypassing the recipient NDS node and subsequent routing to the identified NDS node 410. For example, the resolver client component 606 can be configured to generate and transmit a query message including at least a portion of the identified node identifier to a network directory service such as a DNS server or an LDAP server, as illustrated by the identified NDS node 410. FIG. 7 illustrates an NDS protocol layer 706 provided in the execution environment 702 and configured to communicate with an NDS node with a protocol supported by both the NDS protocol layer 706 and an NDS node. The resolver client component 606 can provide the query or query information to the NDS protocol layer 706. The NDS protocol layer 706 can be configured to format the query in one or more messages to be sent to an NDS node. The NDS protocol layer 706 can be in communication with the network 404 by the network stack 708 configured to transmit data over the network 404 to the identified NDS node 410 identified by the received node address.

According to an aspect the query can include a message identifying the node name and sending it to the NDS based on the NDS address included as a destination address) to subscribe to node name/address association changes. In such an aspect, the resolver client component 606 can be configured to open listening for a message from the NDS identified by the network address where the message identifies a network address associated with the node name.

Returning to FIG. 5, in block 508 a response including the second node identifier in the second identifier domain space is received. Accordingly, a system for resolving a first node identifier in a first identifier domain space to a second node identifier in a second identifier domain space includes means for receiving a response including the second node identifier in the second identifier domain space. For example, as illustrated in FIG. 6, the resolver client component 606 is configured to receive a response including the second node identifier in the second identifier domain space.

A response to the query, for example sent from the identified NDS node 410, can identify the second node identifier in the second domain space. Referring to FIG. 7, the response can be received from the network 404 via the network stack 708 and received by the NDS protocol layer 706. The NDS protocol layer can provide the second node identifier in the second domain space of the identified node 408 received in the response to the resolver client component 606.

Figure 8:
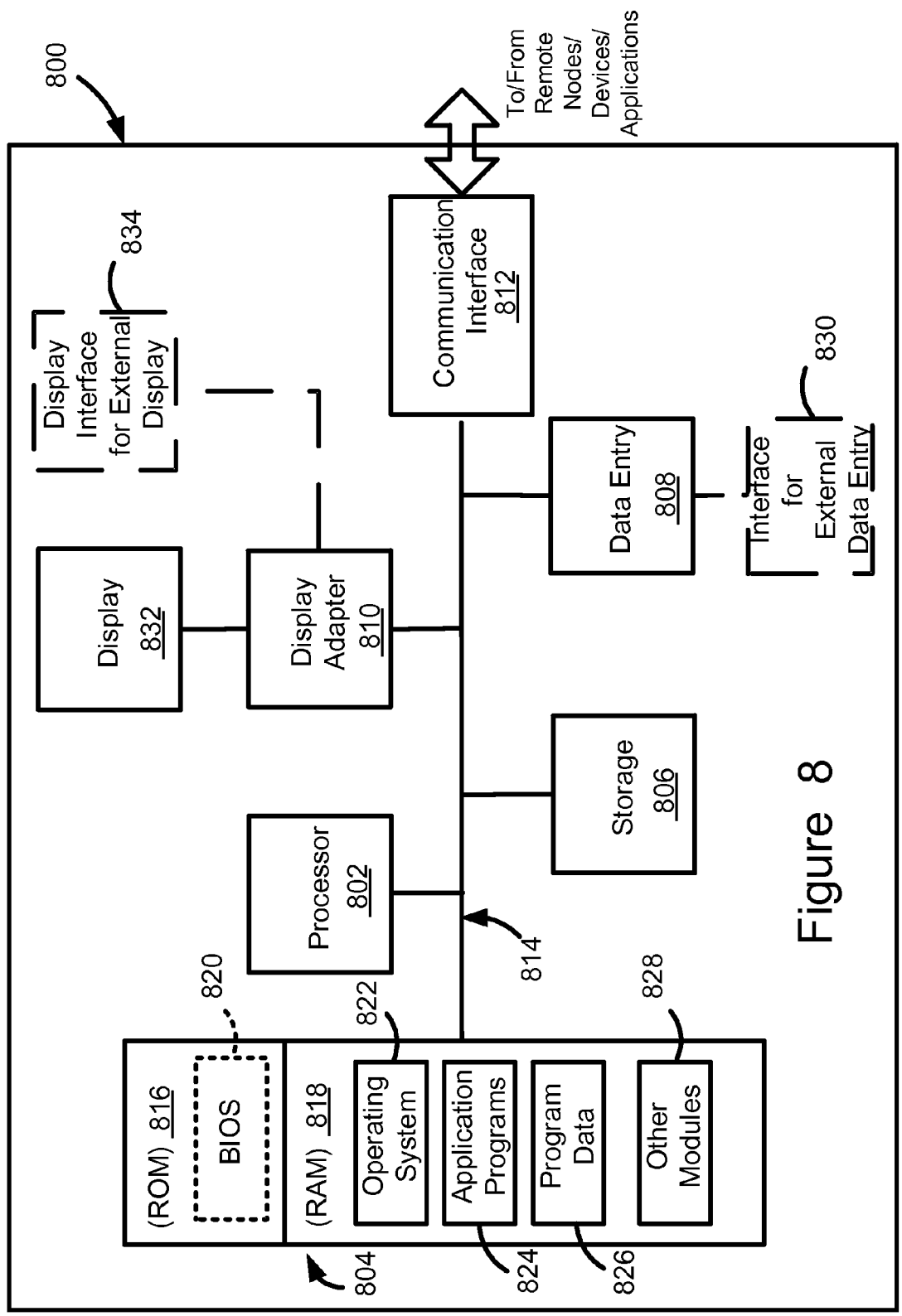
FIG. 8 is a block diagram illustrating an exemplary hardware device in which the subject matter may be implemented

An exemplary hardware device in which the subject matter described above may be implemented shall be described. Those of ordinary skill in the art will appreciate that the elements illustrated in FIG. 8 may vary depending on the system implementation. With reference to FIG. 8, an exemplary system for implementing the subject matter disclosed herein includes a hardware device 800, including a processing unit 802, memory 804, storage 806, data entry 808, display adapter 110, communication interface 812, and a bus 814 that couples elements 804-812 to the processing unit 802.

The bus 814 may comprise any type of bus architecture. Examples include a memory bus, a peripheral bus, a local bus, etc. The processing unit 802 is an instruction execution machine, apparatus, or device and may comprise a microprocessor, a digital signal processor, a graphics processing unit, an ASIC (application specific integrated circuit), a field programmable gate array (FPGA), etc. The processing unit 802 may be configured to execute program instructions stored in memory 804 and/or storage 806 and/or received via data entry 808.

The memory 804 may include read only memory (ROM) 816 and random access memory (RAM) 818. Memory 804 may be configured to store program instructions and data during operation of device 800. In various embodiments, memory 804 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or Rambus DRAM (RDRAM), for example. Memory 804 may also include nonvolatile memory technologies such as nonvolatile "flash" RAM (NVRAM) or ROM. In some embodiments, it is contemplated that memory 804 may include a combination of technologies such as the foregoing, as well as other technologies not specifically mentioned. When the subject matter is implemented in a computer system, a basic input/output system (BIOS) 820, containing the basic routines that help to transfer information between elements within the computer system, such as during start-up, is stored in ROM 816.

The storage 806 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 800. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, random access memories, read only memories, and the like may also be used in the exemplary operating environment. As used here, a "computer-readable medium" can include one or more of any suitable media for storing the executable instructions of a computer program in one or more of an electronic, magnetic, optical, and electromagnetic, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

A number of program modules may be stored on the storage 806, ROM 816 or RAM 818, including an operating system 822, one or more applications programs 824, program data 826, and other program modules 828. A user may enter commands and information into the hardware device 800 through data entry module 808. Data entry 808 may include mechanisms such as a keyboard, a touch screen, a pointing device, etc. Other external input devices (not shown) are connected to the hardware device 800 via external data entry interface 830. By way of example and not limitation, external input devices may include a microphone, joystick, game pad, satellite dish, scanner, or the like. In some embodiments, external input devices may include video or audio input devices such as a video camera, a still camera, etc. Data entry 808 may be configured to receive input from one or more users of device 800 and to deliver such input to processing unit 802 and/or memory 804 via bus 814.

A display 832 is also connected to the bus 814 via display adapter 810. Display 832 may be configured to display output of device 800 to one or more users. In some embodiments, a given device such as a touch screen, for example, may function as both data entry 808 and display 832. External display devices may also be connected to the bus 814 via external display interface 834. Other peripheral output devices, not shown, such as speakers and printers, may be connected to the hardware device 800.

The hardware device 800 may operate in a networked environment using logical connections to one or more remote nodes (not shown) via communication interface 812. The remote node may be another computer, a server, a router, a peer device or other common network node, and typically includes many or all of the elements described above relative to the hardware device 800. The communication interface 812 may interface with a wireless network and/or a wired network. Examples of wireless networks include, for example, a BlueTooth® network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 812 may include logic configured to support direct memory access (DMA) transfers between memory 804 and other devices.

In a networked environment, program modules depicted relative to the hardware device 800, or portions thereof, may be stored in a remote storage device, such as, for example, on a server. It will be appreciated that other means of establishing a communications link between the hardware device 800 and other devices may be used.

It should be understood that the arrangement of hardware device 800 illustrated in FIG. 8 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 800. In addition, while at least one of these components are implemented at least partially as an electronic hardware component, and therefore constitutes a machine, the other components may be implemented in software, hardware, or a combination of the two. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 8. Other components may be implemented in software, hardware, or a combination of the two. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that preceded, the subject matter that has been described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

It should be understood that the various system components (and means) defined by the claims and illustrated in the various block diagrams represent logical components that are configured to perform the functionality described herein. While at least one of these components are implemented at least partially as an electronic hardware component, and therefore constitutes a machine, the other components may be implemented in software, hardware, or a combination of the two. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of the two. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Moreover, the methods described herein can be embodied in executable instructions stored in a computer readable medium for use by or in connection with an instruction execution machine, apparatus, or device, such as a computer-based or processor-containing machine, apparatus, or device. As used here, a "computer-readable medium" can include one or more of any suitable media for storing the executable instructions of a computer program in one or more of an electronic, magnetic, optical, and electromagnetic, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

The use of the terms "a" and "an" and "the" and similar referents in the context of describing the subject matter (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illuminate the subject matter and does not pose a limitation on the scope of the subject matter unless otherwise claimed. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

Thus, the subject matter described herein can be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for resolving a first node identifier in a first identifier domain space to a second node identifier in a second identifier domain space, the method comprising: identifying a first node identifier from a first identifier domain space, the first node identifier included in data for transmission to a recipient; determining a network directory service node address for a network directory service node configured to resolve the first node identifier to a second node identifier in a second identifier domain space; generating a message addressed to the recipient, the message including the data; and transmitting, to the recipient, the message in association with transmitting, to the recipient, the network directory service node address, wherein at least one of the step above is performed on at least one electronic hardware component.

2. The method of claim 1 wherein the first node identifier includes a symbolic name from a domain name service name space.

3. The method of claim 1 wherein the first node identifier is an outside scope identifier.

4. The method of claim 1 wherein the data includes markup language based data including the first node identifier as a markup language element of the markup language based data.

5. The method of claim 1 wherein the data is included in at least one of a header portion and a payload portion of a message for transmission to the recipient.

6. The method of claim 1 wherein determining the network directory service node address includes receiving configuration data including node address information identifying the network directory service node address.

7. The method of claim 1 wherein determining the network directory service node address includes presenting a user interface configured to receive node address information identifying the network directory service node address.

8. The method of claim 1 wherein determining the network directory service node address includes:
generating a query message based on the first node identifier;
transmitting the query message to a default network directory service node; and
receiving a response including node address information identifying the network directory service node address.

9. The method of claim 1 wherein determining the network directory service node address includes determining at least a portion of a domain portion of the first node identifier is shared by the node performing the determination, wherein the network directory service node is a default network directory service node and the network directory service node address is cached on the node performing the determination.

10. The method of claim 1 wherein transmitting, to the recipient, the message in association with transmitting, to the recipient, the network directory service node address includes transmitting, to the recipient, the message including the network directory service node address.

11. The method of claim 1 wherein transmitting, to the recipient, the message in association with transmitting, to the recipient, the network directory service node address includes transmitting, to the recipient, a second message associated with the message, the second message including the network directory service node address.

12. A method for resolving a first node identifier in a first identifier domain space to a second node identifier in a second identifier domain space, the method comprising: receiving a message including a first node identifier in a first identifier domain space in association with receiving a node address of a network directory service node configured to resolve the first node identifier to a second node identifier in a second identifier domain space; generating a query including the first node identifier; transmitting the query addressed with the network directory service node address; and receiving a response including the second node identifier in the second identifier domain space, wherein at least one of the step above is performed on at least one electronic hardware component.

13. The method of claim 12 wherein the first node identifier includes a symbolic name from a domain name service name space.

14. The method of claim 12 wherein the first node identifier is an outside scope identifier.

15. The method of claim 12 wherein receiving the message in association with receiving the network directory service node address includes receiving the message including the network directory service node address.

16. The method of claim 12 wherein receiving the message in association with receiving the network directory service node address includes receiving the message in association with receiving a second message associated with the message, the second message including the network directory service node address.

17. A system for resolving a first node identifier in a first identifier domain space to a second node identifier in a second identifier domain space, the system comprising:
means for identifying a first node identifier from a first identifier domain space, the first node identifier included in data for transmission to a recipient;
means for determining a network directory service node address for a network directory service node configured to resolve the first node identifier to a second node identifier in a second identifier domain space;
means for generating a message addressed to the recipient, the message including the data; and
means for transmitting, to the recipient, the message in association with transmitting, to the recipient, the network directory service node address,
wherein at least one of the means includes at least one electronic hardware component.

18. A system for resolving a first node identifier in a first identifier domain space to a second node identifier in a second identifier domain space, the system comprising system components including:
a content handler component configured to identify a first node identifier from a first identifier domain space, the first node identifier included in data for transmission to a recipient;
a resolver client component configured to determine a network directory service node address for a network directory service node configured to resolve the first node identifier to a second node identifier in a second identifier domain space;

a message generator component configured to generate a message addressed to the recipient, the message including the data; and a message transmitter component configured to transmit, to the recipient, the message in association with transmitting, to the recipient, the network directory service node address, wherein at least one of the system components includes at least one electronic hardware component.

19. The system of claim 18 wherein the content handler component is configured to identify the first node identifier including a symbolic name from a domain name service name space.

20. The system of claim 18 wherein the content handler component is configured to identify the first node identifier as an outside scope identifier.

21. The system of claim 18 wherein the content handler component is configured to identify the first node identifier in the data including markup language based data including the first node identifier as a markup language element of the markup language based data.

22. The system of claim 18 wherein the content handler component is configured to identify the first node identifier in the data included in at least one of a header portion and a payload portion of a message for transmission to the recipient.

23. The system of claim 18 wherein the resolver client component is configured to receive configuration data including node address information identifying the network directory service node address.

24. The system of claim 18 wherein the resolver client component is configured to provide for presenting a user interface configured to receive node address information identifying the network directory service node address.

25. The system of claim 18 further including an NDS protocol layer configured to:
generate a query message based on the first node identifier;
transmit the query message to a default network directory service node; and
receive a response including node address information identifying the network directory service node address.

26. The system of claim 18 wherein the resolver client component is configured to determine at least a portion of a domain portion of the first node identifier that is shared by the node performing the determination, wherein the network directory service node is a default network directory service node and the network directory service node address is cached on the node performing the determination.

27. The system of claim 18 wherein the message transmitter component is configured to transmit, to the recipient, the message in association with transmitting, to the recipient, the network directory service node address includes transmitting, to the recipient, the message including the network directory service node address.

28. The system of claim 18 wherein the message transmitter component is configured to transmit, to the recipient, the message in association with transmitting, to the recipient, the network directory service node address includes transmitting, to the recipient, a second message associated with the message, the second message including the network directory service node address.

29. A system for resolving a first node identifier in a first identifier domain space to a second node identifier in a second identifier domain space, the system comprising:
means for receiving a message including a first node identifier in a first identifier domain space in association with receiving a node address of a network directory service node configured to resolve the first node identifier to a second node identifier in a second identifier domain space;
means for generating a query including the first node identifier;
means for transmitting the query addressed with the network directory service node address; and
means for receiving a response including the second node identifier in the second identifier domain space,
wherein at least one of the means includes at least one electronic hardware component.

30. A system for resolving a first node identifier in a first identifier domain space to a second node identifier in a second identifier domain space, the system comprising system components including:
a message receiver component configured to receive a message including a first node identifier in a first identifier domain space in association with receiving a node address of a network directory service node configured to resolve the first node identifier to a second node identifier in a second identifier domain space;
a content handler component configured to generate a query including the first node identifier; and
a resolver client component configured to transmit the query addressed with the network directory service node address and configured to receive a response including the second node identifier in the second identifier domain space,
wherein at least one of the system components includes at least one electronic hardware component.

31. The system of claim 30 wherein the message receiver component is configured to receive the first node identifier including a symbolic name from a domain name service name space.

32. The system of claim 30 wherein the message receiver component is configured to receive the first node identifier as an outside scope identifier.

33. The system of claim 30 wherein the message receiver component is configured to receive the message in association with receiving the network directory service node address includes receiving the message including the network directory service node address.

34. The system of claim 30 wherein the message receiver component is configured to receive the message in association with receiving the network directory service node address includes receiving the message in association with receiving a second message associated with the message, the second message including the network directory service node address.

35. A Non-transitory computer readable medium embodying a computer program, executable by a machine, for resolving a first node identifier in a first identifier domain space to a second node identifier in a second identifier domain space, the computer program comprising executable instructions for:
identifying a first node identifier from a first identifier domain space, the first node identifier included in data for transmission to a recipient;
determining a network directory service node address for a network directory service node configured to resolve the first node identifier to a second node identifier in a second identifier domain space; and
generating a message addressed to the recipient, the message including the data;
transmitting, to the recipient, the message in association with transmitting, to the recipient, the network directory service node address.

36. A Non-transitory computer readable medium embodying a computer program, executable by a machine, for resolving a first node identifier in a first identifier domain space to a second node identifier in a second identifier domain space, the computer program comprising executable instructions for:
   receiving a message including a first node identifier in a first identifier domain space in association with receiving a node address of a network directory service node configured to resolve the first node identifier to a second node identifier in a second identifier domain space;
   generating a query including the first node identifier; and
   transmitting the query addressed with the network directory service node address;
   receiving a response including the second node identifier in the second identifier domain space.

* * * * *

UNITED STATES PATENT AND TRADEMARK OFFICE
CERTIFICATE OF CORRECTION

| | | |
|---|---|---|
| PATENT NO. | : 7,933,272 B2 | Page 1 of 1 |
| APPLICATION NO. | : 12/401707 | |
| DATED | : April 26, 2011 | |
| INVENTOR(S) | : Robert P. Morris | |

It is certified that error appears in the above-identified patent and that said Letters Patent is hereby corrected as shown below:

Column 1, line 12, "here" should read --hereby--

Column 2, line 65, replace ";" with --.--

Column 4, line 35, delete, "that"

Column 4, line 47, "includes" should read --include--

Column 4, line 53, after "such" insert --as--

Column 4, line 54, "an" should read --as--

Column 4, line 55, delete "as"

Column 5, line 17, "with" should read --within--

Column 5, line 30, after "from" insert --a--

Column 7, line 54, "406" should read --404--

Column 8, line 63, "included" should read --includes--

Column 10, line 25, after "such" insert --as--

Column 12, line 65, "included" should read --including--

Column 13, line 20, replace "generating a query" with --a query is generated--

Column 14, line 10, "Figure 4" should read --Figure 6--

Column 14, line 37, "address)" should read --address--

Signed and Sealed this
Twenty-seventh Day of December, 2011

David J. Kappos
*Director of the United States Patent and Trademark Office*